(12) United States Patent
Gaillard et al.

(10) Patent No.: US 12,226,926 B2
(45) Date of Patent: *Feb. 18, 2025

(54) APPLICATION HEAD COMPRISING A CUTTING SYSTEM WITH TWO MOVABLE BLADES

(71) Applicant: CORIOLIS GROUP, Quéven (FR)

(72) Inventors: Loïc Gaillard, Lanester (FR); Julien Coudurier, Lorient (FR)

(73) Assignee: Coriolis Group, Queven (FR)

( * ) Notice: Subject to any disclaimer, the term of this patent is extended or adjusted under 35 U.S.C. 154(b) by 125 days.

This patent is subject to a terminal disclaimer.

(21) Appl. No.: 16/767,234

(22) PCT Filed: Nov. 23, 2018

(86) PCT No.: PCT/FR2018/000254
§ 371 (c)(1),
(2) Date: Apr. 1, 2021

(87) PCT Pub. No.: WO2019/102081
PCT Pub. Date: May 31, 2019

(65) Prior Publication Data
US 2024/0208096 A1    Jun. 27, 2024

(30) Foreign Application Priority Data
Nov. 27, 2017 (FR) .................................... 17 01245

(51) Int. Cl.
*B26D 1/06*      (2006.01)
*B29C 70/38*     (2006.01)
*B29C 70/54*     (2006.01)

(52) U.S. Cl.
CPC ............ *B26D 1/065* (2013.01); *B29C 70/384* (2013.01); *B29C 70/545* (2013.01); *B29C 2793/0027* (2013.01)

(58) Field of Classification Search
CPC ................ B29C 70/384; B29C 70/545; B29C 2793/0027; B26D 2001/0033;
(Continued)

(56) References Cited

U.S. PATENT DOCUMENTS 7,849,903 B2   12/2010   Vaniglia
8,205,532 B2    6/2012   Devlieg et al.
(Continued)

FOREIGN PATENT DOCUMENTS

DE   102013111100        4/2015
DE   102015224689 A1     6/2017
(Continued)

OTHER PUBLICATIONS

DE102013111100A1_Machine Translation (Year: 2015).*
(Continued)

*Primary Examiner* — Yunju Kim
(74) *Attorney, Agent, or Firm* — Husch Blackwell LLP

(57) ABSTRACT

An application head specially designed to produce parts made of composite materials, comprising an application system, guiding means defining a guiding plane, a cutting system for cutting a fiber, the cutting system comprising a first blade movable in translation along a cutting direction and provided with a bevel defining a first cutting edge and a second blade movable in translation along the cutting direction and provided with a bevel defining a second cutting edge, the bevels being opposed to allow an overlapping of the cutting edges.

11 Claims, 10 Drawing Sheets

(58) Field of Classification Search
CPC ............ B26D 2001/0046; B26D 1/045; B26D 1/065; B26D 1/105; B26D 1/115; B26D 1/125; B26D 1/165; B26D 1/255; B26D 1/265; B26D 1/305

See application file for complete search history.

(56) References Cited

U.S. PATENT DOCUMENTS

| | | | |
|---|---|---|---|
| 10,821,682 | B2 | 11/2020 | Hamlyn et al. |
| 11,230,070 | B2 * | 1/2022 | Gaillard ................ B29C 70/384 |
| 11,230,071 | B2 * | 1/2022 | Gaillard ................ B29C 70/541 |
| 2017/0197372 | A1 | 7/2017 | Modin et al. |
| 2019/0077094 | A1 * | 3/2019 | Hamlyn ................ B26D 1/065 |
| 2020/0353703 | A1 | 11/2020 | Gaillard et al. |
| 2021/0107237 | A1 | 4/2021 | Gaillard et al. |

FOREIGN PATENT DOCUMENTS

| | | |
|---|---|---|
| EP | 0846551 | 6/1998 |
| EP | 2228200 A1 | 9/2010 |
| ES | 2253005 A1 | 5/2006 |
| FR | 3011499 A1 | 4/2015 |
| WO | WO2008132301 | 11/2008 |
| WO | WO-2010070245 A1 | 6/2010 |
| WO | WO2017072421 | 5/2017 |
| WO | WO2017097818 | 6/2017 |

OTHER PUBLICATIONS

Application and File history for U.S. Appl. No. 15/733,136, filed May 27, 2020. Inventors: Gaillard et al.

Application and File history for U.S. Appl. No. 16/767,504, filed Nov. 9, 2020. Inventors: Gaillard et al.

International Search Report and Written Opinion for PCT/FR2018/000255, mailed May 14, 2019, 11 pages.

International Search Report and Written Opinion for PCT/FR2018/000257, mailed Feb. 13, 2019, 9 pages.

International Search Report and Written Opinion for PCT/FR2018/000254 date mailed Feb. 27, 2019.

* cited by examiner

APPLICATION HEAD COMPRISING A CUTTING SYSTEM WITH TWO MOVABLE BLADES

RELATED CASES

The present application is a National Phase entry of PCT Application No. PCT/FR2018/000254, filed Nov. 23, 2018 which claims priority from FR Patent Application No. 1701245, filed Nov. 27, 2017, which applications are hereby incorporated by reference in their entireties.

TECHNICAL FIELD

Embodiments of the present invention relate to an application head especially designed for a fiber application machine to produce composite material parts, and more particularly a fiber application head equipped with a particular cutting system. Embodiments also relate to a method for manufacturing composite material parts by means of a corresponding application head.

BACKGROUND ART

Fiber application machines are known for the application by contact on a layup tool, such as a male or female mold, of a fiber or a wide strip formed of one or more continuous flat fibers, of the tow type, dry or impregnated with thermosetting or thermoplastic resin, in particular carbon fibers, consisting of a multitude of carbon threads or filaments.

These fiber application machines, also called fiber placement machines, conventionally comprise an application head, a displacement system able to displace the application head, storage means for storing the fibers and conveying means for conveying the fibers from the storage means to the application head. The latter conventionally comprises an application roller for applying a fiber or a strip of several fibers onto an application surface of a layup tool, a guiding system for guiding a single fiber or a strip of several fibers to the application roller, and for each fiber, a cutting system for cutting a fiber, rerouting means for rerouting the fiber to the application roller after a cut by the cutting system, and a clamping system for clamping the fiber that has just been cut.

Each cutting system conventionally comprises a blade able to be maneuvered along a cutting direction between an inactive position and an active position for cutting a fiber.

In some of the proposed cutting systems, such as in WO 2008/132301, the movable blade abuts in the active position against a counter-tool, for example a bar made of elastomeric material. This type of cut is satisfactory, although the number of cuts may be limited, in particular due to the relatively rapid wear of the cutting edge of the blade or of the counter-tool. Furthermore, these cutting systems appear to be unsuitable for cutting fibers of large widths because of the cutting force required to instantaneously cut the fiber across its entire width.

Other systems, described in particular in WO 2017/072421 and U.S. Pat. No. 8,205,532, use a fixed blade or counter-blade, the fiber being cut by shearing as the blade is displaced relative to the counter-blade. These cutting systems allow a greater number of cuts before they need to be replaced. In addition, these cutting systems allow for a guillotine-type cut, using blades with an inclined cutting edge to progressively cut the fiber and thus reduce the cutting force. However, in both types of cutting systems, the movable blade tends to displace the fiber towards the counter-tool or the counter-blade, which can impart to a curvature that is detrimental to its application by the roller of the application head. This can also interfere with the rerouting. Furthermore, in the case of a fiber pre-impregnated with a thermosetting resin, the fiber may remain stuck to the fixed counter-tool or counter-blade or to the guiding system after being cut by the moving blade.

It was also found that in the case of a guillotine cut, the cut end of a fiber could exhibit an inclination with respect to the longitudinal direction of the fiber. This inclination is explained by the fact that during the time interval corresponding to the displacement of the blade, from its inactive position to its active position, the application roller continues to apply the fiber that is being cut perpendicularly to the cutting direction of the moving blade holder. The greater the width of the fiber or the longer the time interval, the greater the inclination is.

SUMMARY

The purpose of the invention is to propose a solution to overcome at least one of the above-mentioned draw backs.

For this purpose embodiments of, the invention relate to an application head especially designed for producing composite material parts, comprising an application system, for example 3. an application roller and, preferably for each fiber, guiding means defining a guiding plane, a cutting system for cutting a fiber guided by the guiding means and applied by the application system, the cutting system comprising a first blade movable in translation along a cutting direction between an inactive position and an active position and provided with a bevel defining a first cutting edge, wherein the cutting system comprises a second blade movable in translation along the cutting direction between an inactive position and an active position and provided with a bevel defining a second cutting edge, the bevels being opposed to allow an overlapping of the cutting edges preferably during a time interval defined by an initial instant and an end instant, corresponding respectively to an inactive position and an active position of the blades.

By this arrangement, the risk of deforming the fiber during cutting is reduced or even eliminated. In the case of a pre-impregnated fiber, the risk of sticking the fiber to one or the other moving blade is reduced or even eliminated. This allows a fiber to be cut "in the middle", that is without deviation from the guiding plane defined by the guiding means. This arrangement also slows down the wear of the blades over time, since the cutting force is distributed over the two blades.

According to an embodiment, the head according to the invention further comprises, preferably for each fiber, rerouting means for rerouting a fiber to the application roller after a cut performed by the cutting system, as well as preferably a clamping system for clamping a fiber that has just been cut.

The cutting edges of the two blades can be rectilinear, curvilinear or have a broken line, for example V-shaped.

Rectilinear cutting edges can extend parallel to each other, from the inactive to the active position of the blades in the cutting direction to instantly cut the fiber across its entire width.

Preferably they form a non-zero constant cutting angle, from the inactive positions of the blades to their active positions, one blade or both blades then having an inclined cutting edge, the cutting edge(s) forming an angle different from 90° with the cutting direction, the cutting edge(s) being inclined with respect to a direction perpendicular to the cutting direction. Preferably also the bisector of the cutting angle is perpendicular to the cutting direction, whereby both blades have an inclined cutting edge. By this arrangement, the time interval is reduced in comparison with previous cutting systems. Indeed, the cutting point defined by the apex of the cutting angle propagates faster at the intersection of the cutting edges when the blades are both movable along the cutting direction. This arrangement also enables the cutting of wide fibers with a reduced cutting force.

In order to cut a fiber "in the middle", that is without deviation of the fiber from the guiding plane, the blades will be fixed with respect to blade holders in such a way that the bisector of the cutting angle is contained in the fiber guiding plane and the blade holders will be displaced at a same translational speed to maintain the bisector in this plane, from inactive positions to active positions of the blades.

According to a first particular embodiment, the cutting system comprises a first control means able to displace the first and second blades in opposite directions along the cutting direction.

Preferably, the first control means comprises a cylinder actuating a cylinder rod cooperating with the first and second blades via a transmission cone, or preferably via a first lever and a second lever connected respectively to the blades. The transmission cone helps to reduce the overall dimensions of the cutting system, while the two-lever arrangement furthermore enables the cylinder to transmit a higher cutting force and thus to reduce the cutting angle of the cutting edges of the blades.

According to a second particular embodiment, the first and second blades are movable together, in translation along the guiding plane or in rotation around a direction parallel to an application roller of the application system between an initial position and an end position. The term "together" means that the first and second blades maintain their alignment along the cutting direction during their displacement.

This arrangement allows the cutting edges to displace with the fiber, while also displacing in the translation direction of the blades. To cancel the inclination of the cut end of a fiber, the blades will be displaced at the same speed as the one of the displacement of the fiber applied by the application roller. Since the mobility of the two blades allows a faster cut, the magnitude of the displacement of the blades with the fiber will be reduced. In addition, since the difference in speed between the blades and the fiber is reduced, or even zero, the abrasion that the blades undergo due to the friction of the fiber is reduced, thus slowing down the wear of the blades.

In a first embodiment variant, the application head comprises a second control means able to displace the first and second blades together in translation along the guiding plane between an initial position and an end position.

In a second embodiment variant, the application head comprises an integrated control means able to displace the first and second blades in translation along the cutting direction and to displace together the blades in rotation around a direction parallel to the rotation axis of the roller, the integrated control means being able to displace the blades between a first state in which the blades are in inactive position and in initial position and a second state in which the blades are in active position and in final position.

An integrated control means enables reduction of the overall dimensions of the cutting system in the application head while making the translational motion of the first and second blades along the cutting direction, together with the rotational motion of the cutting direction. The inclination of the cut end of the fiber can thus be reduced or eliminated by displacing, via a rotational motion, the cutting direction together with the displacement of the fiber applied by the roller. It should be noted that this rotation results in a slight deviation from a direction of translation of the fiber. However, this deviation is kept within acceptable limits.

Advantageously, the integrated control means comprises a control lever movable around a first rotation axis and provided with a first lever arm articulated to a first blade holder carrying the first blade and a second lever arm articulated, via a link, to a second blade holder carrying the second blade, the second lever arm being controlled in displacement by a cylinder rod, the first blade holder being articulated, by means of a link, to a second rotation axis and the first and second blade holders being connected to each other by a sliding connecting means for sliding along the cutting direction.

In this arrangement, the sliding connecting means ensures that the alignment of the two blades movable along the cutting direction is maintained during their overall rotational displacement.

According to an embodiment, the second blade is elastically biased in abutment against the first blade, either directly flat or by its cutting edge, or indirectly, for example via their respective blade holders. This elastic mounting of the blades, in the active positions and inactive positions of the blades, ensures an optimal position in time of the two blades in relation to each other, and thus an efficient cut. An optimum position between the blades is maintained, especially in the event of wear of the blades. According to an embodiment, the first blade is in the form of a flat plate having a general U-shape, with the first cutting edge formed at the base of the U between the two arms of the U, the second blade, preferably formed of a plate having a general rectangular shape, is elastically biased in abutment against the first blade, the second blade being in flat abutment by its face opposite its bevel against the face of the first blade opposite its bevel, or by its cutting edge against the first blade, more particularly against the face of the first blade opposite its bevel, the second blade being in abutment against the arms of the U of the first blade in the inactive positions of the blades in which the cutting edges are spaced apart from one another. A U-shaped blade according to embodiments of the invention enables the second blade to be brought into elastic abutment against the first blade, in particular in the inactive positions of the blades, while being simple to manufacture, in particular as regards the making of the cutting edge between the two arms.

Furthermore, the arms of the U ensure a guiding of the fiber, in particular during cutting, and thus avoid any blocking of the fiber during cutting.

According to a particular embodiment, each blade comprises two cutting edges, as described in patent document US2017/0197372, with a first cutting edge at a distal end of the blade and a second cutting edge at an edge of a window of the blade, the movable blades then being able to cut a fiber via the first cutting edges by displacement of the blades in a first direction in the cutting direction, and to cut a fiber passing through the two superimposed windows of the blades via the second cutting edges by displacement of the blades in the second opposite direction.

The present invention also relates to a method for manufacturing a composite material part comprising the application of continuous fibers onto an application surface, wherein the application of fibers is carried out by means of a fiber application head as previously described, by relative displacement of the application head with respect to the layup surface along layup trajectories.

The fibers conventionally used are continuous flat fibers, also called tows, generally unidirectional, and comprising a multitude of filaments. The deposited fibers may be dry fibers or fibers preimpregnated with thermosetting or thermoplastic resin. The fibers are typically ⅛, ¼ or ½ inch wide. The term "fiber" in this document also refers to fibers of greater width, greater than ½ inch, conventionally referred to as tape in placement technology, for example, of 1 inch, 1.5 inch or 2 inches.

Other advantages of the invention will become apparent from the description of the embodiments illustrated by the drawings.

Figure 1:
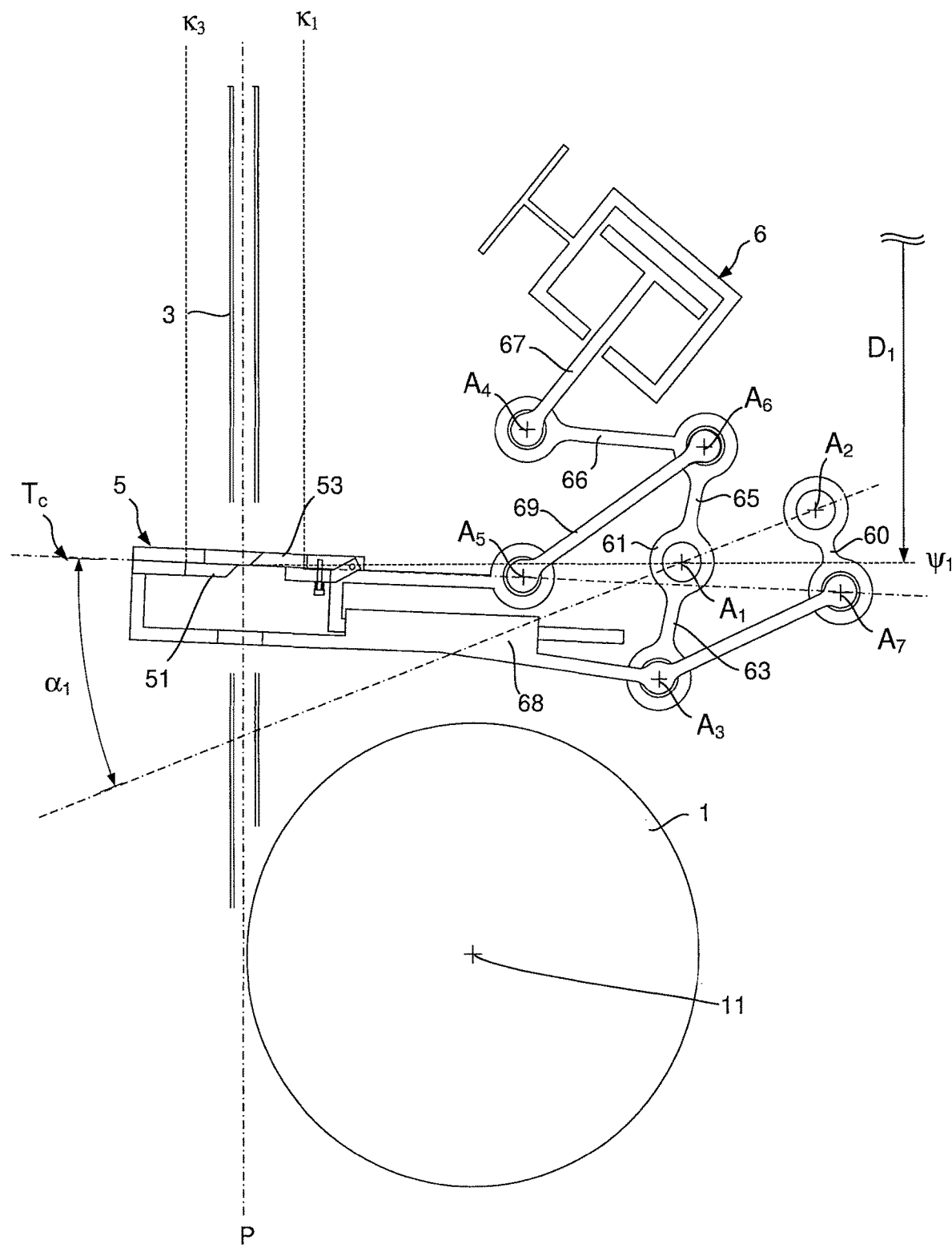
FIG. 1 is a schematic view of the cutting system according to a first embodiment of the invention, showing the blades in an initial position along a guiding plane and in two inactive positions along the cutting direction.

According to a first embodiment of the invention, illustrated by FIGS. 1 to 6, an application head comprises an application roller 1, and for each fiber, guiding means 3 defining a guiding plane P for guiding the fiber entering into the head along a guiding plane towards the roller, and a cutting system 5. The guiding means of a fiber are for example formed by a guiding channel formed at the assembly interface of two plates, the guiding plane corresponding to a median longitudinal plane of the channel. When the head is intended for the application of a strip of several fibers, the head comprises a guiding channel for each fiber and a cutting system for each fiber, and may comprise a single roller for applying all the fibers, or several rollers, for example one roller for each fiber. Other guiding means may include tube sections or one or more pulleys.

The cutting system 5 comprises first and second blades 51, 53 movable in translation along a cutting direction $T_c$ between two inactive positions $\kappa_1$, $\kappa_3$ and two active positions $\kappa_2$, $\kappa_4$. The blades 51, 53 are movable together between an initial cutting position $\psi_1$ and a final cutting position $\psi_2$ representing a variation in distance along the guiding plane P.

An integrated control means 6 is adapted to displace the first and second blades 51, 53 in translation along the cutting direction $T_c$ and to displace them together between the initial cutting position $\psi_1$ and final cutting position $\psi_2$, in rotation around a direction parallel to the rotation axis 11 of the application roller 1, the integrated control means being adapted to displace the blades between their inactive and initial positions and their active and final positions.

The integrated control means comprise a control lever 61 movable around a first rotation axis $A_1$ and provided with a first lever arm 63 and a second lever arm 65, 66. A first blade holder 57 carrying the first blade 51 is articulated to the first lever arm 63. A second blade holder 59 carrying the second blade 53 is articulated to the second lever arm 65, 66 by means of a link 69. The lever 61 is controlled in displacement by the rod 67 of a cylinder, articulated to the second lever arm 65, 66. The first blade holder 57 is articulated to a second rotation axis $A_2$ by means of a link 60 and the first and second blade holders 57, 59 being connected to each other by a sliding connecting means 68 for sliding along the cutting direction.

The rotation axes $A_1$ and $A_2$ are fixed with respect to a support structure of the application head, the cylinder being fixedly mounted by its cylinder body to the support structure. It should be noted that the connection between the cylinder rod 67 and the intermediate link 66 has a clearance, for example in the form of an oblong slot. Alternatively, the cylinder is mounted with a clearance with respect to the mounting support structure.

The rotation axes $A_1$ and $A_2$ are parallel to the guiding plane P and the rotation axis 11 of the compaction roller. The first lever arm 63 is articulated by its end to the first blade holder 57 around a pivot axis $A_3$, and the second lever arm is articulated by its end to the cylinder rod around a pivot axis $A_4$, the two lever arms forming an angle between them, the axes $A_1$, $A_3$ and $A_4$ being not contained in a same plane. The link 69 is articulated by a first end to the second blade holder 59 around a pivot axis $A_5$ and by its second end to the second lever arm around a pivoting axis $A_6$, this pivot axis $A_6$ being arranged between axis $A_1$ and axis $A_4$, on the side of the plane passing through axis $A_1$ and axis $A_4$ which is opposite to axis $A_5$. In the present embodiment shown in the FIGS., the axes $A_1$, $A_3$ and $A_6$ are aligned, contained in the same plane, and the distance between the axes $A_1$ and $A_3$ is equal to the distance between the axes $A_1$ and $A_6$. The rotation axis $A_2$ is arranged on the side of the plane passing through the axes $A_1$ and $A_3$ which is opposite to the blades and to the axis $A_5$, the link 60 being articulated at one end around the fixed axis $A_2$ and at the other end to the first blade holder around a pivot axis $A_2$ which is arranged on the same side of the plane passing through the axes $A_1$ and $A_3$ as the axis $A_2$. The pivot axes $A_3$-$A_7$ are parallel to the rotation axes $A_1$ and $A_2$.

Referring to FIG. 1, both blades 51, 53 are in the inactive positions $\kappa_1$, $\kappa_3$ along the cutting direction $T_c$. The direction $T_c$ makes an angle $\alpha_1$ with the direction passing through the rotation axes $A_1$ and $A_2$ intersecting the guiding plane P at the intersection with the cutting direction Tc. This angle as well as the inactive positions $\kappa_1$, $\kappa_3$ along the cutting direction $T_c$ are determined by the angular orientation of the control lever 61, which is itself determined by the retracted position of the cylinder rod 67.

Figure 2:
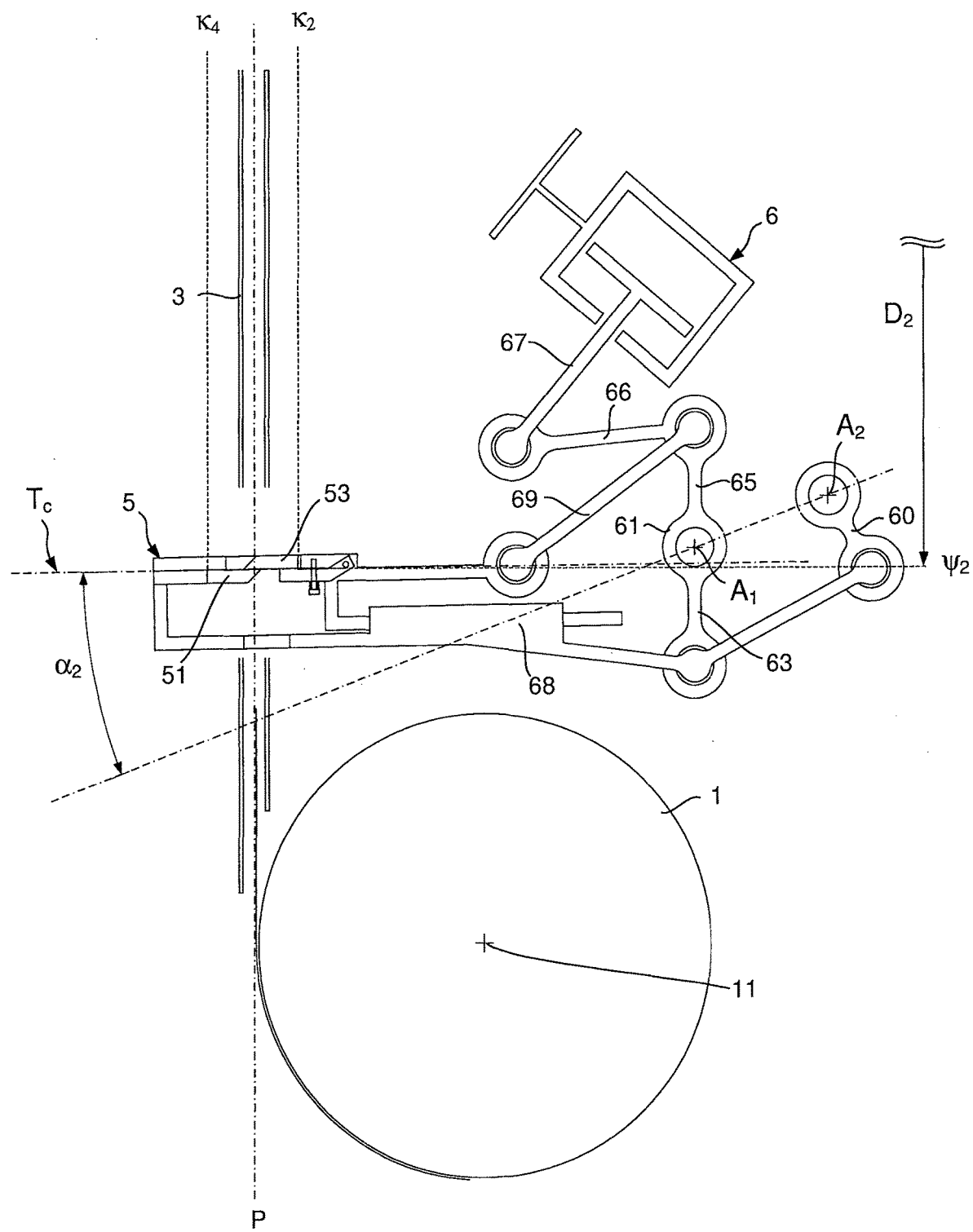
FIG. 2 is a schematic view of the cutting system, showing the blades in an end position along the guiding plane and in two active positions along the cutting direction.

Referring to FIG. 2, both blades 51, 53 have displaced into the active positions $\kappa_2$, $\kappa_4$ along the cutting direction $T_c$.

The direction $T_c$ makes an angle $\alpha_2$ with the direction passing through the axes of rotation $A_1$ and $A_2$. This angle as well as the active positions $\kappa_2$, $\kappa_4$ along the cutting direction $T_c$ are determined by the angular orientation of the control lever 61, which in turn is determined by the extended position of the cylinder rod 67.

In either of the angles $\alpha_1$, $\alpha_2$ taken by the cutting direction $T_c$, the blades 51, 53 remain aligned in said direction, which is ensured by the sliding connecting means 68.

The first blade 51 is provided with a bevel 56 defining a first cutting edge 52 and the second blade 53 is provided with a bevel 58 defining a second cutting edge 54. The first and second cutting edges 52, 54 form between them a cutting angle $\phi$ and the bevels 56, 58 are opposed to allow an overlapping of the cutting edges 52, 54 and propagate a cutting point at the apex of the cutting angle, during a time interval defined by an initial instant and an end instant, corresponding respectively to the inactive positions $\kappa_1$, $\kappa_3$ and the active positions $\kappa_2$, $\kappa_4$ of the blades 51, 53 along the cutting direction $T_c$.

The first blade 51 is fixed to a first blade holder 57. The second blade 53 is fixed to a second blade holder 59 by means of a part 55 pivoting relative to the second blade holder 59 around an axis 50 and pressed against the first blade holder 57 by an elastic return means to control the clearance necessary for the overlapping of the cutting edges 52, 54 of the blades 51, 53. The elastic return means is, for example, a spring mounted around a screw 4 passing through the intermediate part 55 to be screwed into the second blade holder 59, the spring being arranged between the screw head and the intermediate part. According to an embodiment variant, the second blade is elastically biased in abutment directly against the first blade, either flat or by its cutting edge, for example according to the mounting principle described in the above-mentioned application WO 2017/072421.

Figure 3:
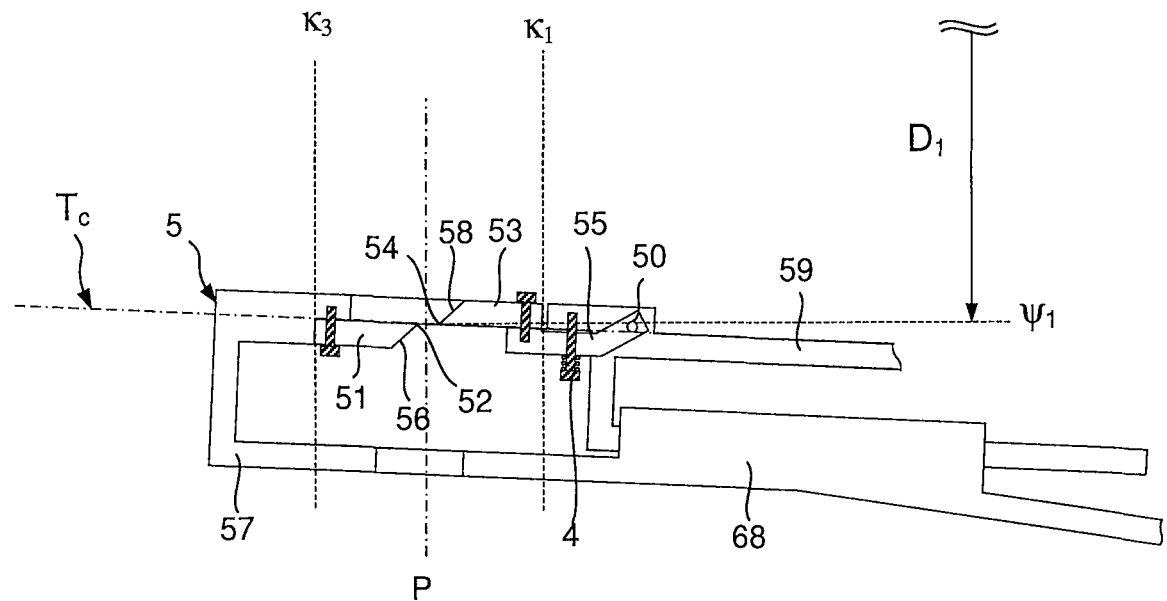
FIG. 3 is an enlarged partial view of the cutting system in-FIG. 1.
Figure 5:
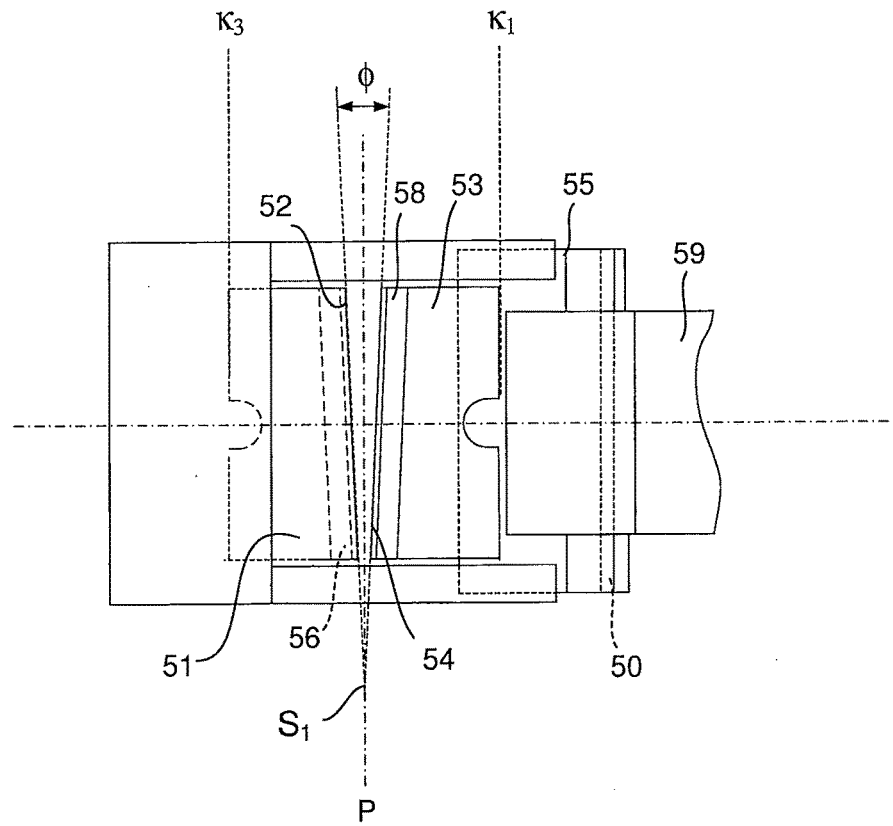
FIG. 5 is an enlarged view of the blades shown in FIG. 1, in top view.

Referring to FIGS. 3 and 5, the first and second blades 51, 53 are in their inactive positions $\kappa_1$, $\kappa_3$ along the cutting direction $T_c$. The apex of the cutting angle $\phi$ is in an initial position $S_1$ determined by the inactive positions $\kappa_1$, $\kappa_3$ in which the cutting edges 52, 54 of the bevels 56, 58 are not overlapped.

Figure 4:
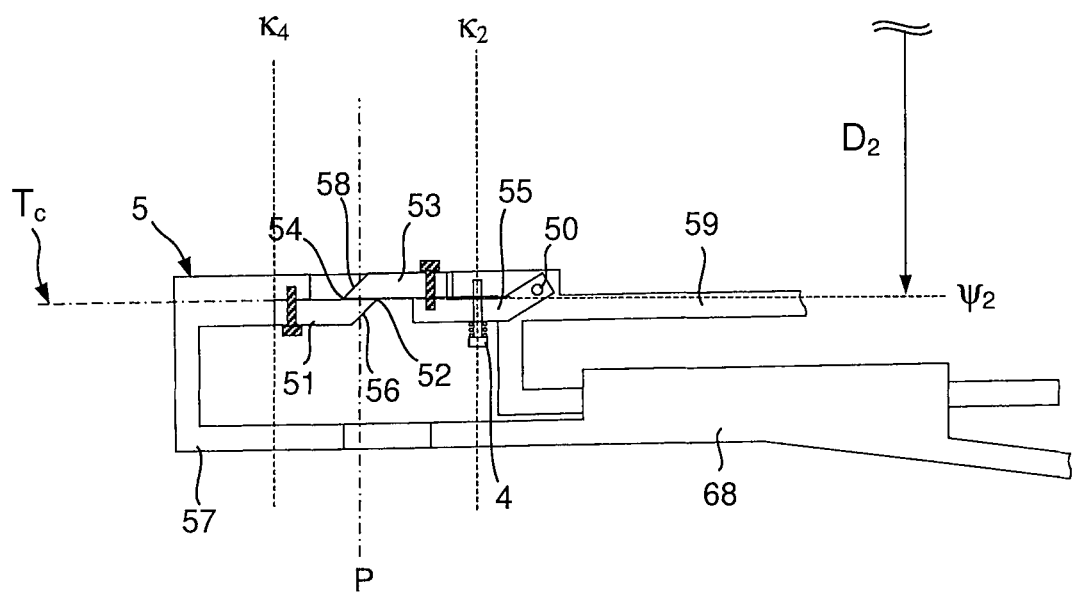
FIG. 4 is an enlarged partial view of the cutting system in FIG. 2.
Figure 6:
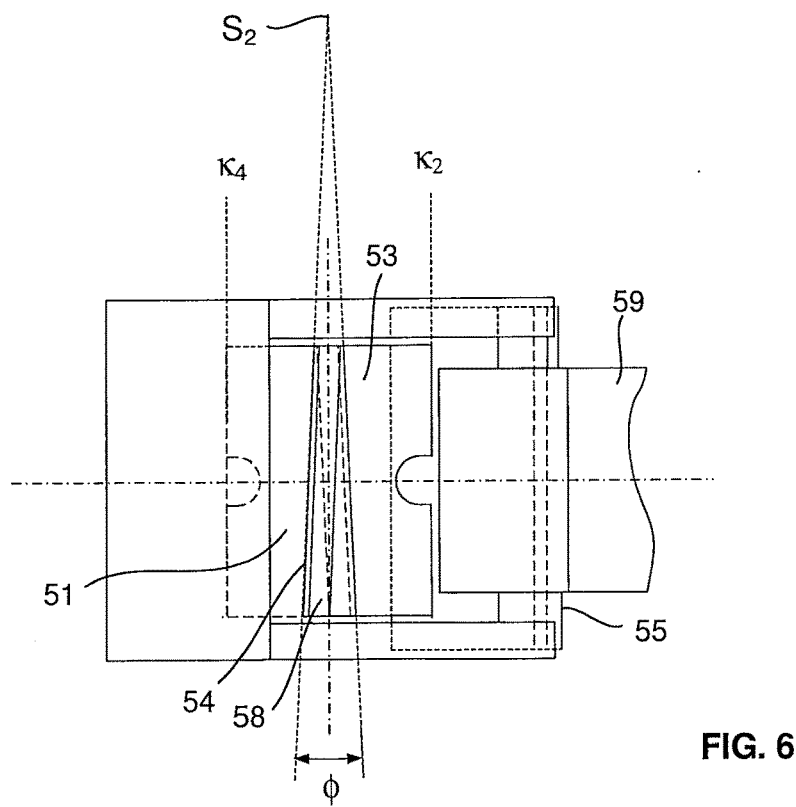
FIG. 6 is an enlargement of the blades shown in FIG. 2, in top view.

FIGS. 4 and 6, the first and second blades 51, 53 have displaced into their active positions $\kappa_2$, $\kappa_4$ in the cutting direction $T_c$. The apex of the cutting angle $\phi$ is in an end position $S_2$ determined by the active positions $\kappa_2$, $\kappa_4$ in which the cutting edges 52, 54 of the bevels 56, 58 are overlapped.

Between the inactive positions $\kappa_1$, $\kappa_3$ and active positions $\kappa_2$, $\kappa_4$, the apex $S_1$, $S_2$ of the cutting angle $\phi$ has propagated as the overlapping of the cutting edges 52, 54 has increased.

The cutting edges 52, 54 are rectilinear and form a constant cutting angle $\phi$, from the inactive positions $\kappa_1$, $\kappa_3$ to the active positions $\kappa_2$. The bisector of the cutting angle $\phi$ is perpendicular to the cutting direction $T_c$. In FIGS. 5 and 6, the inactive positions $\kappa_1$, $\kappa_3$ and the active positions $\kappa_2$, $\kappa_4$ are advantageously chosen symmetrically with respect to the guiding plane P so that the bisector of the cutting angle $\phi$ is coincident with the plane P.

A second embodiment of the invention differs from the previous one in that the application head comprises a first control means able to displace the first and second blades in translation along the cutting direction between their inactive and active positions. The application head comprises a second control means able to displace together the blades in translation along the guiding plane between their initial position and their final position.

The first control means able to displace the first and second blades in translation along the cutting direction comprises a cylinder of parallel gripper type, actuating a cylinder rod cooperating with each gripper of the cylinder via a transmission cone or via first and second levers articulated to the grippers. It should be noted that the grippers perform here the function of the blade holders. This type of cylinder in its two-lever version makes it possible to multiply the cutting forces advantageously.

The second control means able to displace together the first and second blades in translation along the guiding plane comprises a cylinder actuating a cylinder rod able to displace the cylinder of the first control means.

The application head according to the invention is specially designed to be installed in a fiber placement machine for the production of composite material parts. It is completed, with reference to FIGS. 7 to 10, for each fiber, by a clamping system 7 and rerouting means 9.

The clamping system 7 comprises first and second clamping tools 71, 73 movable along a clamping direction $T_b$ between two inactive positions and two active positions in which they abut against each other. A control means 8 is able to displace the first and second clamping tools 71, 73 in translation along the clamping direction $T_b$. It comprises a cylinder 81 actuating a cylinder rod 83 cooperating with the first and second clamping tools 71, 73 by means of a transmission cone 85.

The clamping tools 71, 73 are movable together in translation between an initial clamping position $\beta_1$ and a final clamping position $\beta_2$ representing a variation in distance along the guiding plane P. They are displaced by a control means 10 comprising a cylinder 101 actuating a cylinder rod 103 able to displace the cylinder 81 of the control means 8.

Stripper means 41, 43 are fixed in relation to the structure used as support for the mounting of the application head. The inactive positions of the first and second clamping tools 71, 73 are set back along the clamping direction $T_b$ with respect to the fixed positions of the stripper means 41, 43. The stripper means 41, 43 are movable with the clamping tools 71, 73 in translation along the guiding plane and controlled in displacement by the control means 10.

The rerouting means 9 comprise a first roller 91 and a second roller 93 whose rotation axes 95 and 97 are aligned along a direction R away from the rotation axis 11 of application roller 1. The rerouting means 9 have a fixed position with respect to the application roller 1, between the blades 51, 53 on the one hand and the clamping tools 71, 73 on the other hand.

Figure 7:
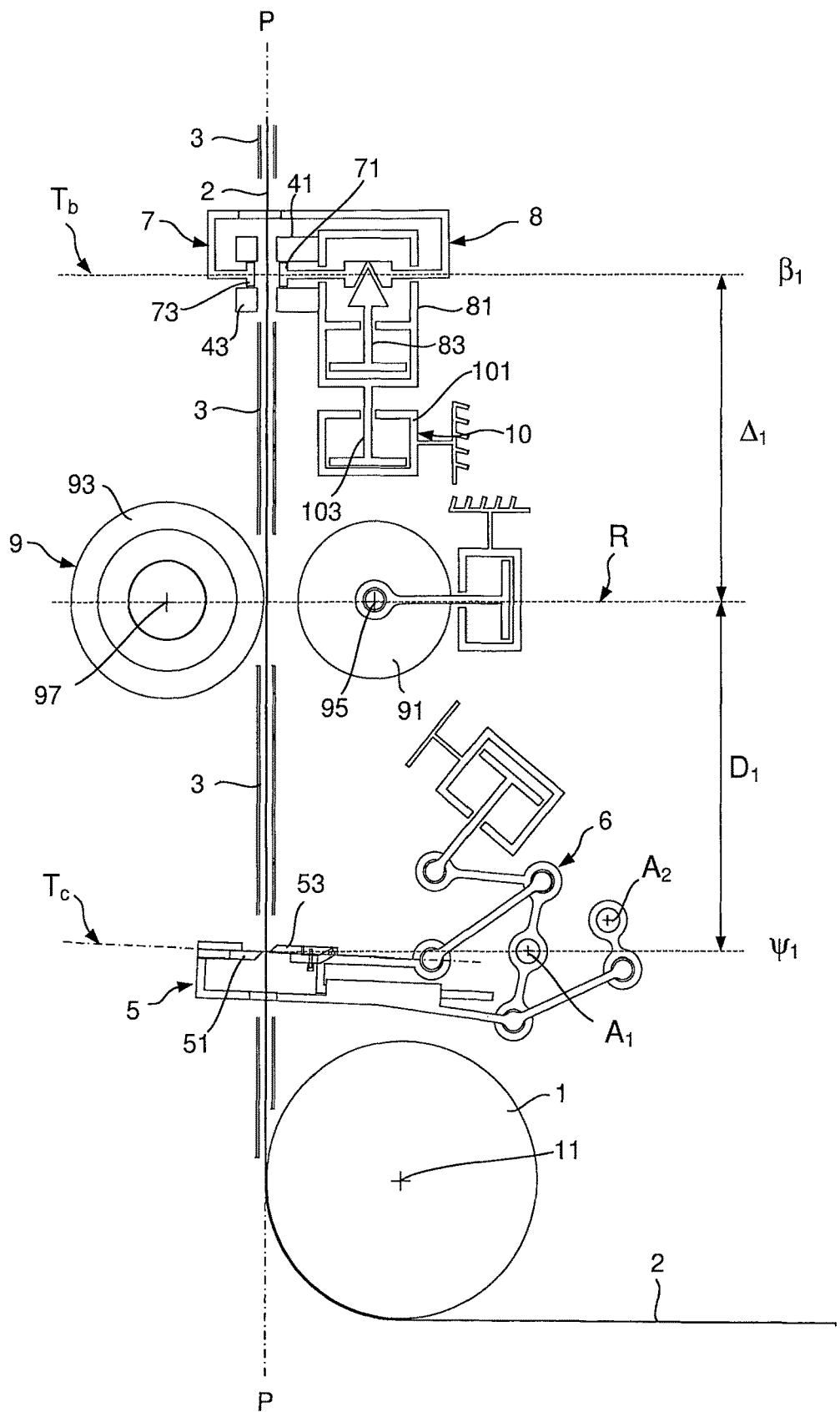
FIG. 7 is a schematic view of an application head, showing the cutting system and a clamping system in initial positions along the guiding plane.

With reference to FIG. 7, both blades 51, 53 are in their initial position 4 in which the distance along the guiding plane P between the cutting direction $T_c$ and the fixed position of rerouting means is equal to $D_1$. Similarly, the two clamping tools 71, 73 are in their initial position $\beta 1$ in which the distance along the guiding plane P between the clamping direction $T_b$ and the fixed position of the rerouting means is equal to $\Delta_1$. Along the cutting direction $T_c$, the blades 51, 53 are in their inactive positions $\kappa_1$, $\kappa_3$ (FIG. 1). Along the clamping direction $T_b$, the clamping tools 71, 73 are in their inactive positions.

Figure 8:
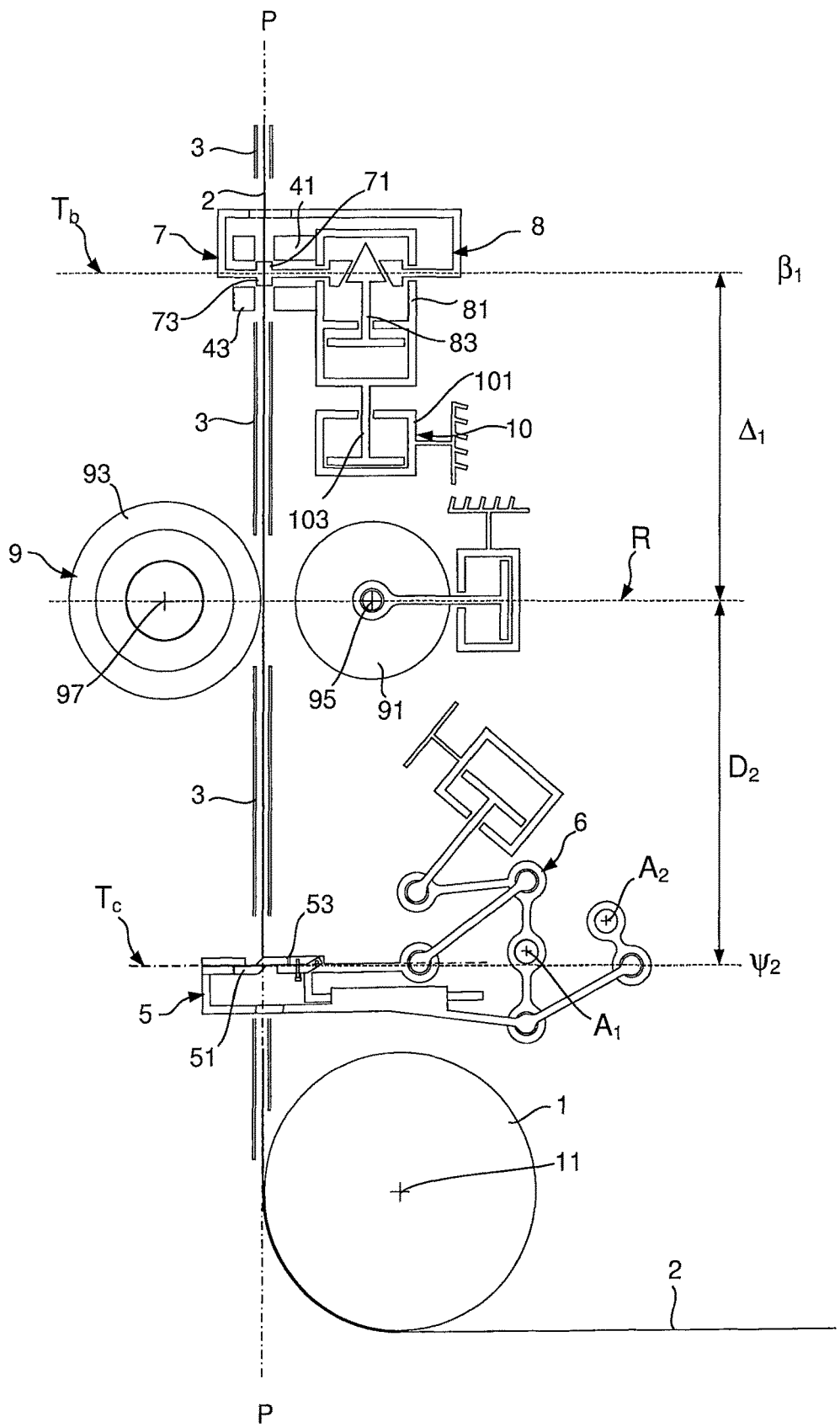
FIG. 8 is a schematic view of the application head in which the blades of the cutting system have displaced to an end position in the guiding plane.

With reference to FIG. 8, the two blades 51, 53 have displaced together to their final position $\psi_2$ in which the distance along the guiding plane P between the cutting direction $T_c$ and the fixed position of the rerouting means is equal to $D_2$. The two clamping tools 71, 73 have remained in the initial position $\beta_1$ shown in FIG. 7. Along the cutting direction $T_c$, the blades 51, 53 have displaced into their active positions $\kappa_2$, $\kappa_4$ (FIG. 2). Along the clamping direction $T_b$, the clamping tools 71, 73 have displaced into their active positions.

Figure 9:
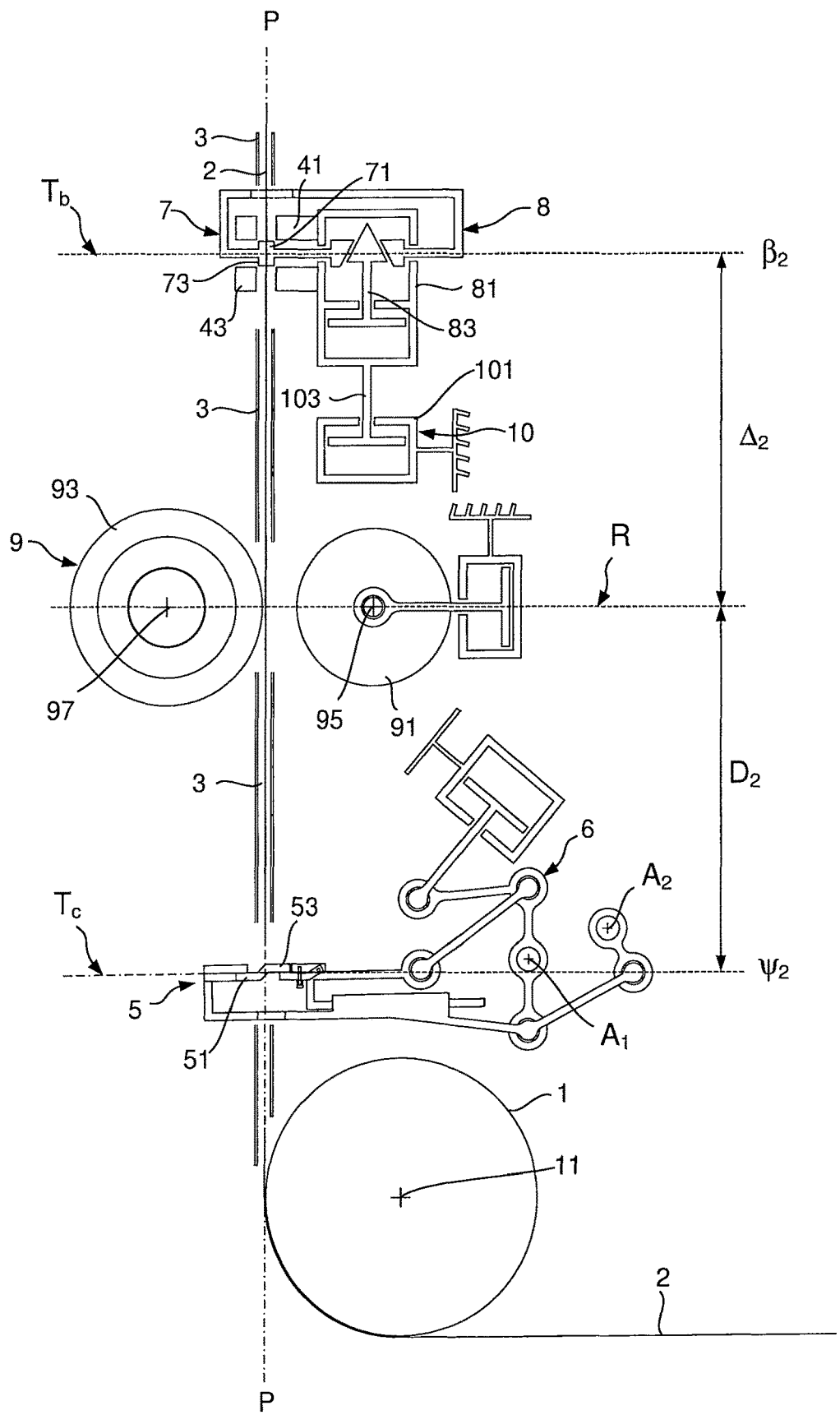
FIG. 9 is a schematic view of the application head, in which the clamping tools of the clamping system have displaced into an end position in the guiding plane.

Referring to FIG. 9, both blades 51, 53 have remained in their final position $\psi_2$ as shown in FIG. 8. The two clamping tools 71, 73 have displaced together into their final position $\beta_2$ for which the distance along the guiding plane between the clamping direction $T_b$ and the fixed position of the rerouting means is equal to $\Delta_2$.

Figure 10:
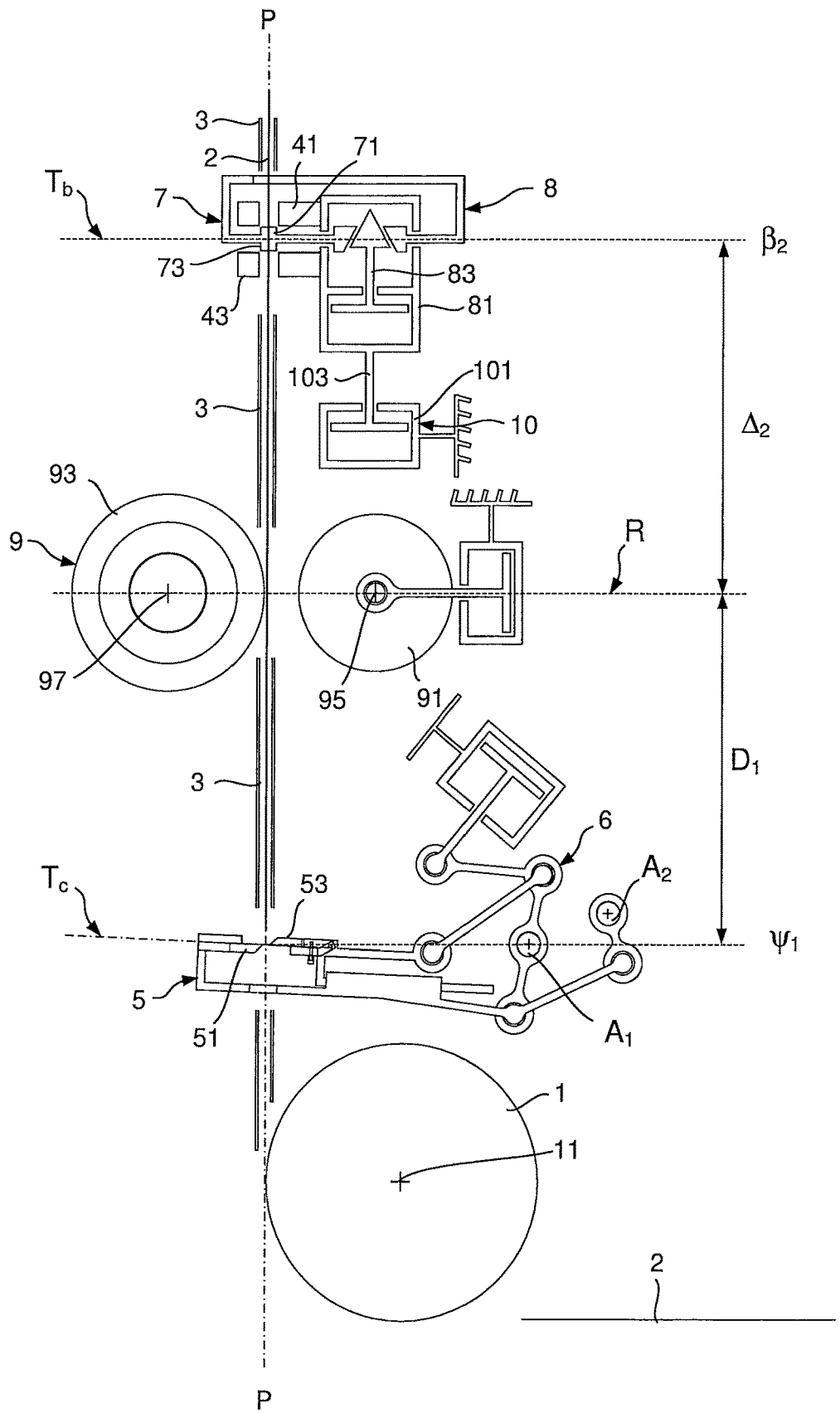
FIG. 10 is a schematic view of the application head, in which the blades of the cutting system are again in the initial position in the guiding plane.
Figure 11:
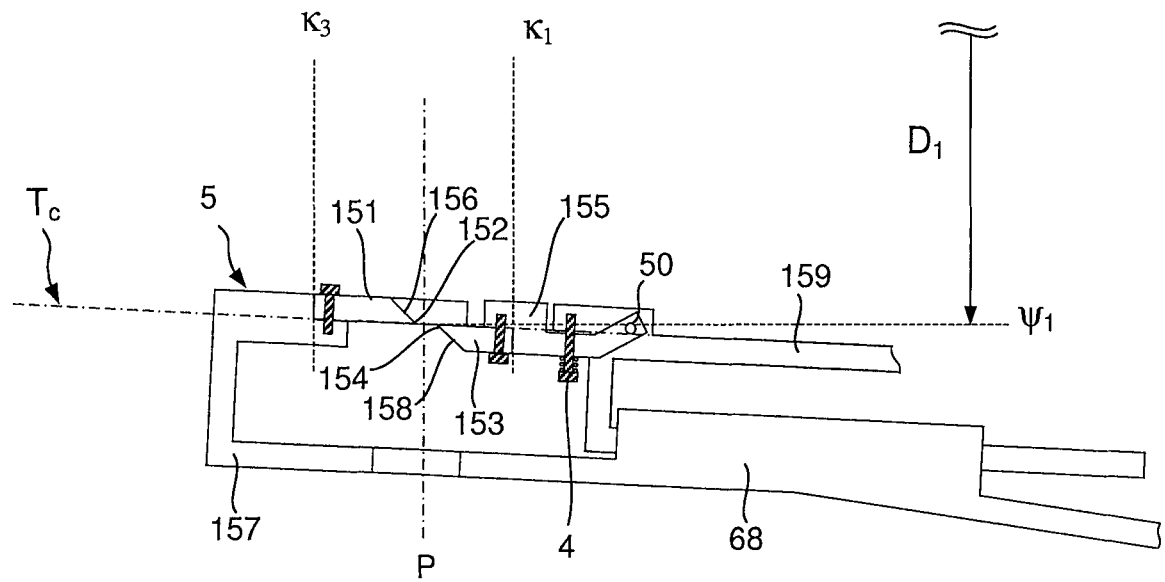
FIG. 11 and FIG. 12 are views similar to those of FIGS. 3 and 4, showing an embodiment variant.
Figure 12:
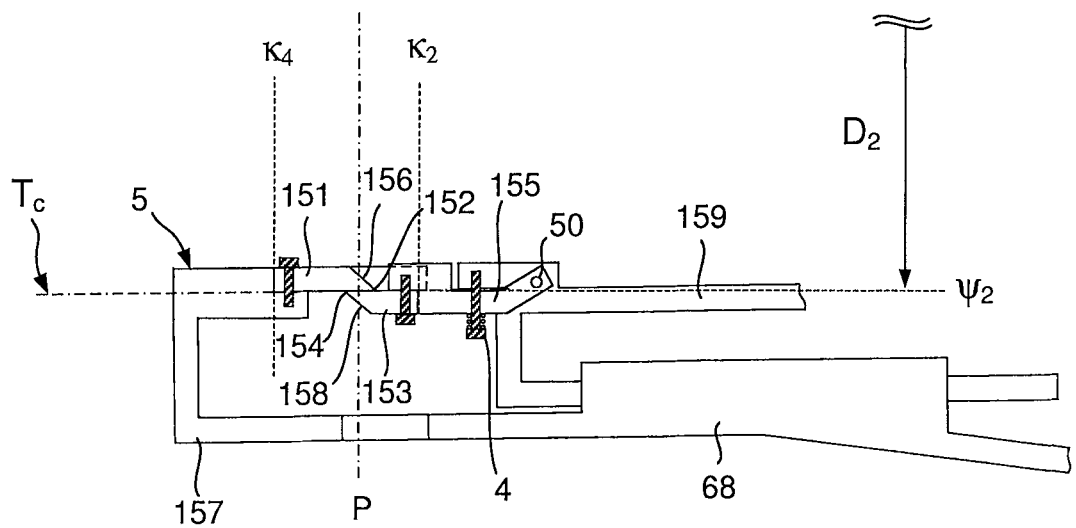
Figure 13:
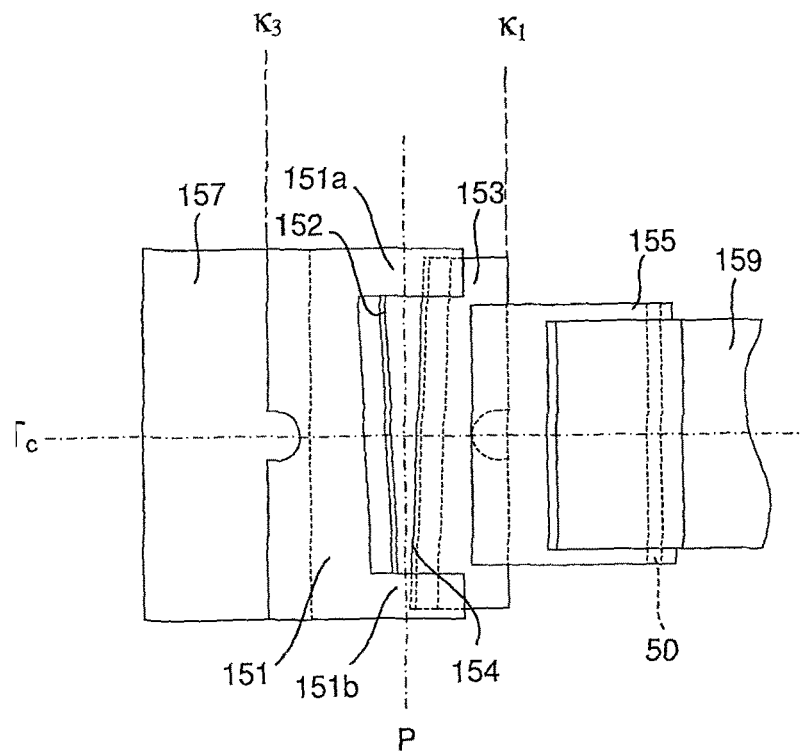
FIGS. 13 and 14 are respectively enlarged top views of the blades shown in FIGS. 11 and 12.
Figure 14:
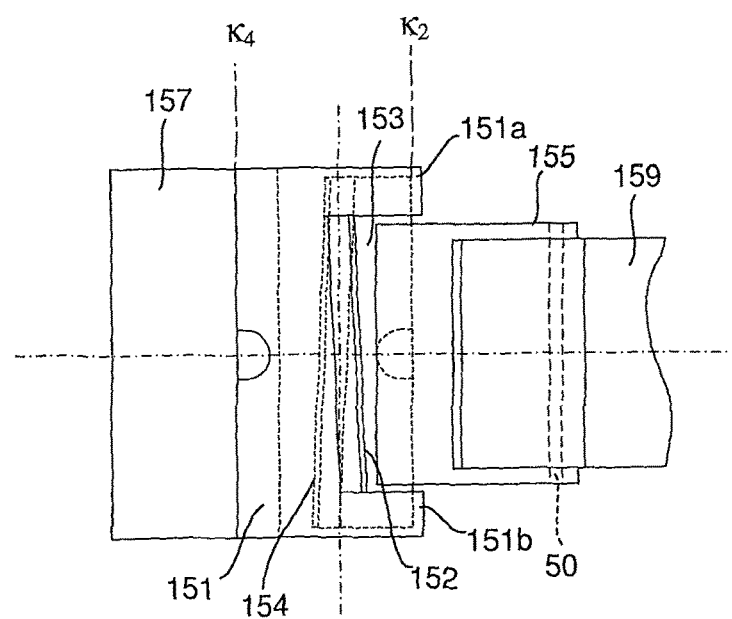

Referring to FIG. 10, the two blades 51, 53 have displaced together to their initial position w shown in FIG. 7. The two clamping tools 71, 73 have remained in their final position $\beta_2$ as shown in FIG. 9. Along the cutting direction $T_c$, the blades 51, 53 have displaced to their inactive positions $\kappa_1$, $\kappa_3$.

The initial distances $D_1$ and $\Delta_1$ are smaller than the final distances $D_2$ and $\Delta_2$. Thus, the initial and final cutting positions 41, 42 represent a positive variation of distance $D_2$–$D_1$ along the guiding plane P and the initial and final clamping position $\beta_1$, $\beta_2$ represent a positive variation of distance $\Delta_2$–$\Delta_1$ along the guiding plane.

It is important to note that the direction R of the rerouting means is an arbitrary reference for the distances $D_1$, $\Delta_1$, $D_2$ and $\Delta_2$. The direction perpendicular to the guiding plane P and passing through axis 11 of application roller 1 is another arbitrary reference for locating the distances. It is sufficient that the reference direction is perpendicular to the guiding plane and has a fixed position in the application head.

A fiber 2 is applied to a substrate (not shown) by the application roller 1 as the application head displaces relative to the substrate. The fiber is guided by the guiding means in the guiding plane P.

A "cut on the fly" operation comprises the following steps:
  first step: FIG. 7, during layup, the fiber 2 circulates freely through the cutting tools formed by the blades 51, 53 and the clamping tools 71, 73. The inactive positions $\kappa_1$, $\kappa_3$ of the cutting tools define a rest state along the cutting direction $T_c$. Likewise, the inactive positions of the clamping tools define a rest state along the clamping direction $T_b$.
  second step: FIG. 8, the fiber 2 is cut by the blades 51, 53 and clamped by the clamping tools 71, 73. The active positions $\kappa_2$, $\kappa_4$ of the blades define an active state along the cutting direction $T_c$. Likewise, the active positions of the clamping tools define an active state in the clamping direction $T_b$.

Between the first and second steps, the blades 51, 53 have undergone, along the guiding plane P, the positive variation in distance $D_2$–$D_1$. This variation makes it possible to displace the cutting direction $T_c$ at the same time as fiber 2 and thus leads to cancelling the inclination of the cut end of the fiber.

The inactive positions $\kappa_1$, $\kappa_3$ along the cutting direction $T_c$ are symmetrical with respect to the guiding plane P and the blades 51, 53 are displaced towards their active positions $\kappa_2$, $\kappa_4$ at the same translation speed. Thus it is possible to cut the fiber 2 "in the middle", that is without deviation from the guiding plane P.
  third step: FIG. 9, blades 51, 53 remain in the active state. Similarly, the clamping tools 71, 73 remain in the active state.

Between the second and third steps, the clamping tools 71, 73 have undergone the positive variation in distance $\Delta_2$–$\Delta_1$ along the guiding plane P. This variation makes it possible to displace the cut and clamped fiber 2 in the opposite direction to the travel direction imposed by the rotation direction of the application roller 1.
  fourth step: FIG. 10, the blades 51, 53 are again in the resting state. The clamping tools 71, 73 remain in the active state.

Between the third and fourth steps, the blades 51, 53 have undergone, along the guiding plane P, the negative variation in distance $D_1$–$D_2$. The variation in distance $\Delta_2$–$\Delta_1$ of the clamping tools 71, 73 is chosen to be greater than the variation of distance $D_2$–$D_1$ of the cutting tools to allow the latter to return to the distance $D_1$ of the rerouting means 9 without the risk of coming into contact with the fiber 2.
  fifth step: the clamping tools 71, 73 are again in the resting state. The blades 51, 53 remain in the resting state. The fiber 2 circulates freely after it has been rerouted by the rerouting means.

Between the fifth step and the first step of the next "on-the-fly" cut, the clamping tools 71, 73 are subjected to the negative variation in distance $\Delta_1$–$\Delta_2$ along the guiding plane P.

The "on-the-fly" cut operation described above can be carried out with an application head in which only one of the two clamping tools is movable in translation along the clamping direction, the other tool being in a fixed position along the direction. Document WO 2008/132301 or EP 846551 describes a movable jaw which, in the active position, abuts against a counter-tool which is along the clamping direction.

FIGS. 11 to 14 illustrate an embodiment variant in which one of the blades is resiliently biased in abutment directly against the other blade. As before, the first blade 151 is provided with a bevel 156 defining a first cutting edge 152, and the second blade 153 is provided with a bevel 158 defining a second cutting edge 154. The first blade 151 is in the form of a flat plate having a U shape, the first cutting edge 152 being formed at the base of the U, between the two arms 151a, 151b of the U. The second blade 153 is, as before, in the form of a rectangular flat plate, one edge thereof constituting the second cutting edge 154. The first blade and the second blade are mounted respectively on a first blade holder 157 and a second blade holder 159, so that the bevels 156, 158 are opposite, facing outwards. The cutting edges are inclined and each form with the cutting direction an angle different from 90°. For example, the inclined edge of a blade is inclined at an angle of 5° with respect to a direction perpendicular to the cutting direction and parallel to the blade plane, the other cutting edge being inclined at an angle of −5° with respect to the direction, the cutting angle between the two cutting edges then being 10°. The second blade 153 is fixed to the second blade holder 159 by means of a part 155 pivotally mounted on the second blade holder 159 around an axis 50, and urged to rotate in the clockwise direction in FIG. 11 by an elastic return means 4, similar to that described above, so that the second blade is resiliently biased in abutment directly against the first blade, either flat, the blades being in abutment by their faces which are opposite to the bevels or, preferably, by its cutting edge 154, the cutting edge being in abutment against the face of the first blade opposite to the bevel 156. In their inactive position, the second blade is in abutment against the arms 151a. 151b of the first blade.

The invention claimed is:

1. Application head specially designed for producing composite material parts, comprising an application roller presenting a rotation axis, guiding means defining a guiding plane, a cutting system for cutting a fiber guided by the guiding means and applied by the application roller, the cutting system comprising a first blade movable in translation along a cutting direction and provided with a bevel defining a first cutting edge, wherein the cutting system comprises a second blade movable in translation along the cutting direction and provided with a bevel defining a second cutting edge said bevels being opposed to allow an overlapping of said cutting edges, the first blade and the second blade are movable together, in translation along the guiding plane or in rotation around a direction parallel to the rotation axis of the application roller.

2. The application head according to claim 1, wherein the first and second cutting edges are rectilinear, and at least one of the two cutting edges is inclined with respect to a direction perpendicular to the cutting direction, so that the two cutting edges form a cutting angle between them.

3. The application head according to claim 2, wherein the first cutting edge and the second cutting edge are inclined so that the bisector of the cutting angle between the first cutting edge and the second cutting edge is perpendicular to the cutting direction.

4. The application head according to claim 1, wherein it comprises a first control means able to displace the first and second blades in opposite directions along the cutting direction.

5. The application head according to claim 4, wherein the first control means comprises a cylinder actuating a cylinder rod cooperating with the first and second blades via a transmission cone or via a first lever and a second lever connected respectively to said blades.

6. The application head according to claim 4, the first blade and the second blade are movable together, in translation along the guiding plane or in rotation around a direction parallel to the rotation axis of the application roller, the application head further comprising a second control means able to displace the first and second blades together, in translation along the guiding plane.

7. The application head according to claim 1, wherein it comprises an integrated control means able to displace the first blade and the second blades in translation along the cutting direction and to displace together said blades in rotation.

8. The application head according to claim 7, wherein the integrated control means comprises a control lever movable around a first rotation axis and provided with a first lever arm articulated to a first blade holder carrying the first blade and a second lever arm articulated, by means of a link, to a second blade holder carrying the second blade, said second lever arm being controlled in displacement by a cylinder rod, said first blade holder being articulated to a second rotation axis by means of a link and said first and second blade holders being connected together by a sliding connecting means for sliding along the cutting direction.

9. The application head according to claim 1, wherein the second blade is resiliently biased in abutment against the first blade.

10. The application head according to claim 9, wherein the first blade is in the form of a flat plate having the general shape of U, with the first cutting edge formed at the base of the U, between the two arms of the U, the second blade being resiliently biased against the arms of the U of the first blade in the inactive positions of the blades.

11. Method for manufacturing a composite material part comprising the application of continuous fibers onto an application surface, wherein the application of fibers is carried out by means of the application head according to claim 1, by relative displacement of the application head with respect to the layup surface along layup trajectories.

* * * * *